(12) United States Patent
Eryener

(10) Patent No.: US 11,274,661 B2
(45) Date of Patent: Mar. 15, 2022

(54) SOLAR CHIMNEY CONFIGURATION

(71) Applicant: CONSERVAL ENGINEERING INC., Toronto (CA)

(72) Inventor: Dogan Eryener, Istanbul (TR)

(73) Assignee: CONSERVAL ENGINEERING INC., Toronto (CA)

( * ) Notice: Subject to any disclaimer, the term of this patent is extended or adjusted under 35 U.S.C. 154(b) by 330 days.

(21) Appl. No.: 16/485,498

(22) PCT Filed: Feb. 21, 2018

(86) PCT No.: PCT/TR2018/050064
§ 371 (c)(1),
(2) Date: Aug. 13, 2019

(87) PCT Pub. No.: WO2019/164463
PCT Pub. Date: Aug. 29, 2019

(65) Prior Publication Data
US 2021/0324838 A1    Oct. 21, 2021

(51) Int. Cl.
*F03G 6/04*    (2006.01)
*F24S 70/60*    (2018.01)

(52) U.S. Cl.
CPC .............. *F03G 6/045* (2013.01); *F24S 70/60* (2018.05)

(58) Field of Classification Search
CPC ........ F03G 6/045; F05B 2260/24; F03D 1/04; Y02E 10/465; Y02E 10/725; Y02E 10/46; Y02E 10/72
See application file for complete search history.

(56) References Cited

U.S. PATENT DOCUMENTS

| | | | | |
|---|---|---|---|---|
| 3,794,306 A * | 2/1974 | Engalitcheff, Jr. | ....... | F28C 3/06 261/116 |
| 4,452,046 A * | 6/1984 | Valentin | .................... | F03D 9/39 60/641.11 |
| 5,381,048 A * | 1/1995 | Baird | ...................... | F03G 6/045 290/55 |
| 7,511,387 B2 * | 3/2009 | Fakhrai | .................... | F03D 1/04 290/54 |
| 8,875,509 B2 * | 11/2014 | Glezer | ...................... | F03G 6/04 60/641.11 |
| 2010/0071869 A1 * | 3/2010 | Lovisa | .................... | F03G 6/045 165/48.2 |
| 2010/0181779 A1 * | 7/2010 | Elliott | ....................... | F03D 9/25 290/55 |
| 2010/0199668 A1 * | 8/2010 | Coustou | .................... | F03D 9/37 60/641.8 |
| 2011/0074164 A1 | 3/2011 | Kobayashi | | |
| 2016/0298611 A1 | 10/2016 | Jazzar | | |

FOREIGN PATENT DOCUMENTS

| | | |
|---|---|---|
| GB | 2081390 A | 7/1981 |
| WO | 2008/113124 A2 | 8/2008 |
| WO | 2012033380 A2 | 3/2012 |

* cited by examiner

*Primary Examiner* — Shafiq Mian
(74) *Attorney, Agent, or Firm* — Perry + Currier, Inc.

(57) ABSTRACT

The invention subject to the application is related to a solar chimney configuration that is used to produce electrical energy from solar energy using a thermal method; by means of the tripartite chimney system used in the embodiment of the invention the air flows transferred by both the updraft and the downdraft chimneys are utilized, and as a result a high yield of energy is obtained via the vertical turbines that have been positioned at the entrances of the chimneys.

18 Claims, 9 Drawing Sheets

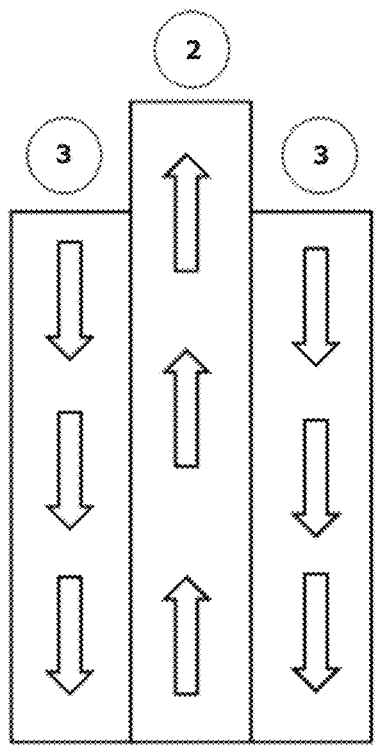
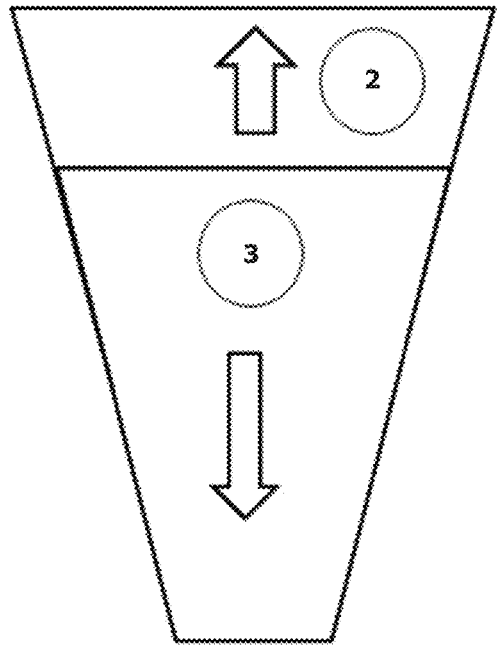
Figure 7
Figure 8
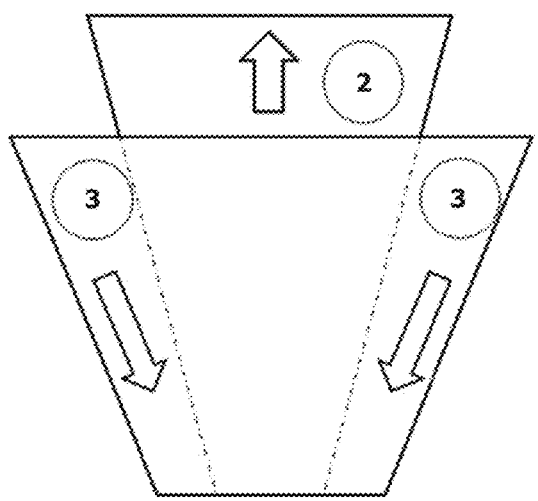
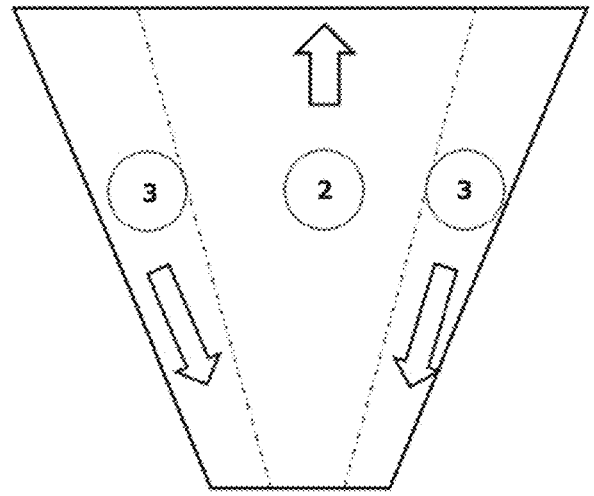
Figure 9
Figure 10

SOLAR CHIMNEY CONFIGURATION

TECHNICAL FIELD

The present invention relates to a configuration of a solar chimney which is used to produce electricity from solar energy by means of a thermal method.

BACKGROUND OF THE INVENTION (PRIOR ART)

In the present state of art, the system known as solar chimney is used for producing electrical energy from solar energy by means of a thermal method. The solar chimney system, also originally known as the Solar Updraft Tower (SUT) in the relevant literature, utilizes a technique which initially converts solar energy into thermal energy and then to kinetic energy, and finally converts said kinetic energy into electrical energy.

Figure 23:
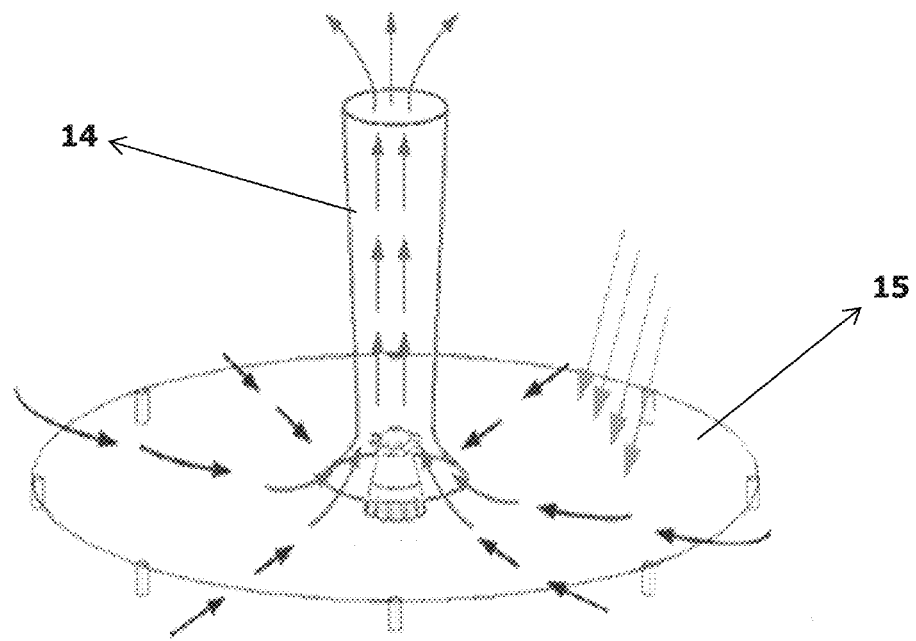
Figure 24:
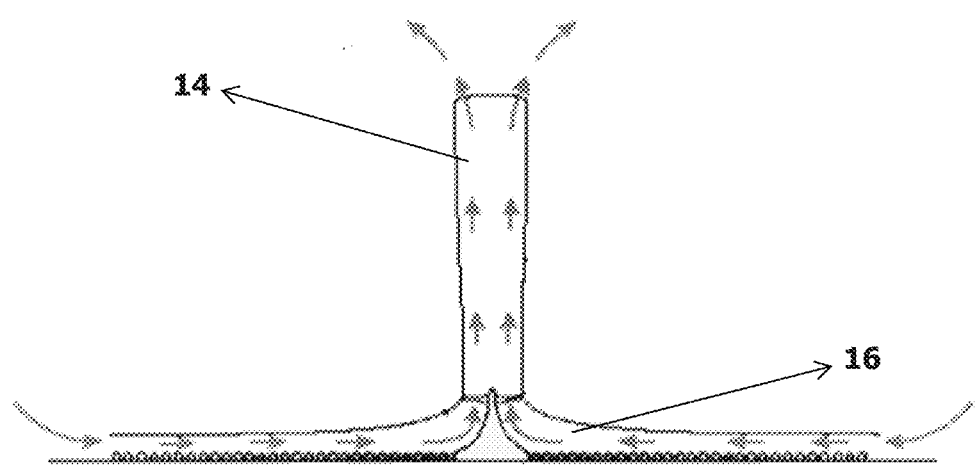

Compared to conventional energy generation systems, the SUT system has a very different working principle and it includes three fundamental physical principles: the greenhouse effect, updraft effect and kinetic energy conversion. As shown in FIG. 23 and FIG. 24, the air located under a circular glass collector is heated via solar radiation which hits the collector surface. Since there is a density difference between warm air and the cold ambient air, the air under the collector moves to the center of the collector horizontally, and it accelerates by the updraft force of the chimney, and is discharged to environment from the open top part of the chimney.

The accelerated air flow enters the chimney, produces electrical energy by rotating the generator which is connected to the turbine located at the entrance of the chimney. This cycle will happen faster when the solar radiation is stronger. Since the chimney pulls the air under the collector, a continuous operation is obtained by the suction of air from the edges of the collector that are open.

In a classical solar chimney technique, energy is generated via a horizontal axis turbine (HAT), inside the chimney that is located at the mid section of the collector. In axial turbine systems also known as HAT, a single chimney is used and the overall system efficiency is directly related to the height of the chimney. As the height of the chimney increases, the efficiency increases; however the production costs and feasibility limits also increase.

On the other hand, the horizontal axis turbines (HAT) used in classic solar chimneys, allow the energy production to be carried out via the unidirectional air flow similar to wind turbines, and this situation is an aspect that decreases energy production efficiency or in technical terms, the power production coefficient.

The first large-scale application of SUT technique was a solar chimney installed at the south of Spain, in 1982. A team led by a German engineer Jörg Schlaich installed an experimental solar chimney which had 50 kW power capacity. This solar chimney that has a collector diameter area of 244 m, was 194.6 m in height, 10 m in diameter and under non-load conditions it reached up to 15 m/s inner chimney air velocity and it operated until 1989.

As it can be seen from this example, the efficiency of solar chimney systems was very low considering their size. For this reason, up until today they have not able to have a widespread use in the known art.

It is the aim of the subject of invention to resolve the productivity problem of the solar chimney systems and make them a feasible recyclable energy source.

BRIEF DESCRIPTION AND OBJECTS OF THE INVENTION

In the present invention, the developed chimney configuration consists of three separate chimney systems. In the tripartite chimney system, the central chimney has an "updraft" function, while the other two adjacent chimneys have a "downdraft" function.

In addition, in the embodiment of the invention, vertical turbines are used which are placed at the entrance of the chimney instead of the interior part of the chimney itself. Vertical turbines, also known in the art as VAT (Vertical Axis Turbines), are the turbines whose rotor blade shaft is positioned perpendicular to the direction of the wind flow.

The following is aimed by the development of the solar chimney configuration subject to the invention;
Reducing the height of the chimney,
Increasing the energy generation efficiency, namely the power coefficient
Increasing the performance continuity,
Increasing feasibility and functionality,
Avoiding the inefficiency of the turbines resulting from unidirectional air flow and improving overall turbine efficiency.

DESCRIPTION OF THE FIGURES ILLUSTRATING THE INVENTION

To better illustrate the solar chimney configuration developed by the present invention, the following figures and associated explanations are as follows.

Figure 1:
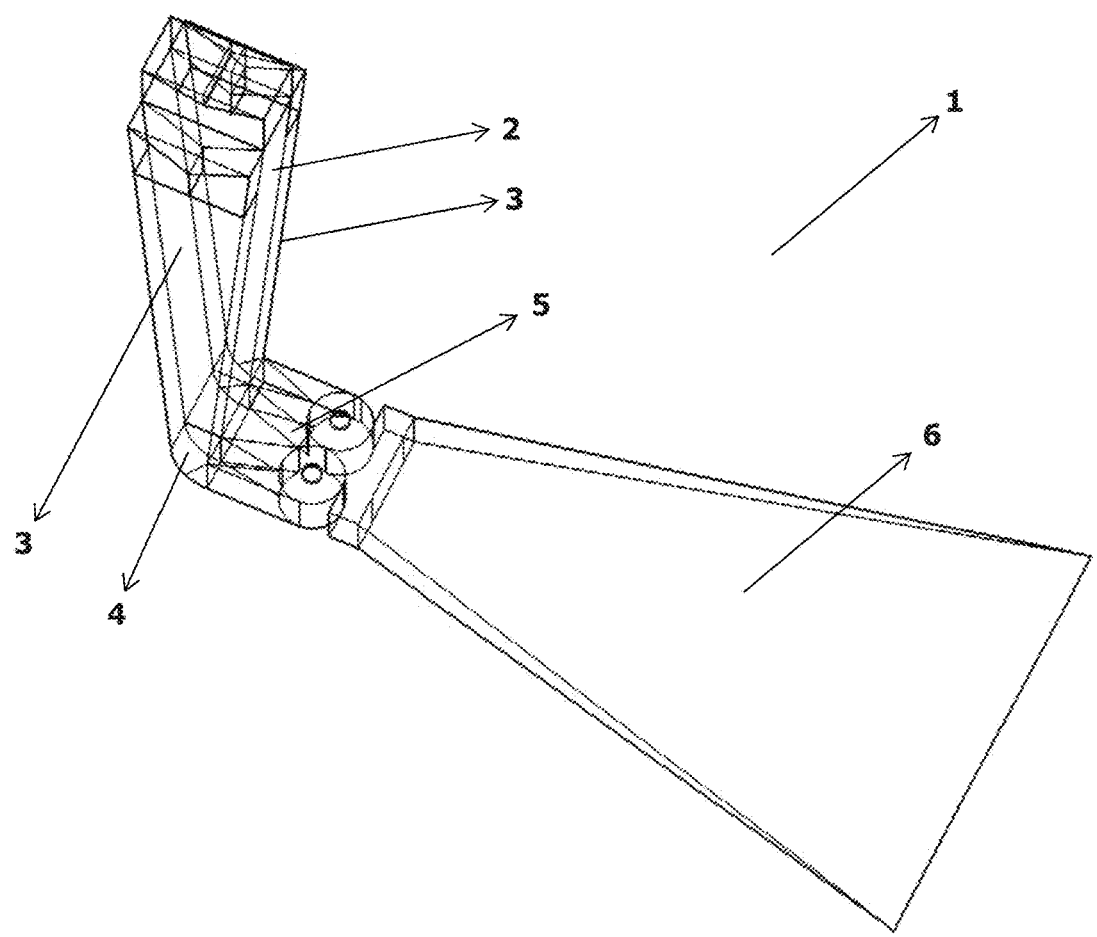

FIG. 1: Top perspective view of the solar chimney configuration.

Figure 2:
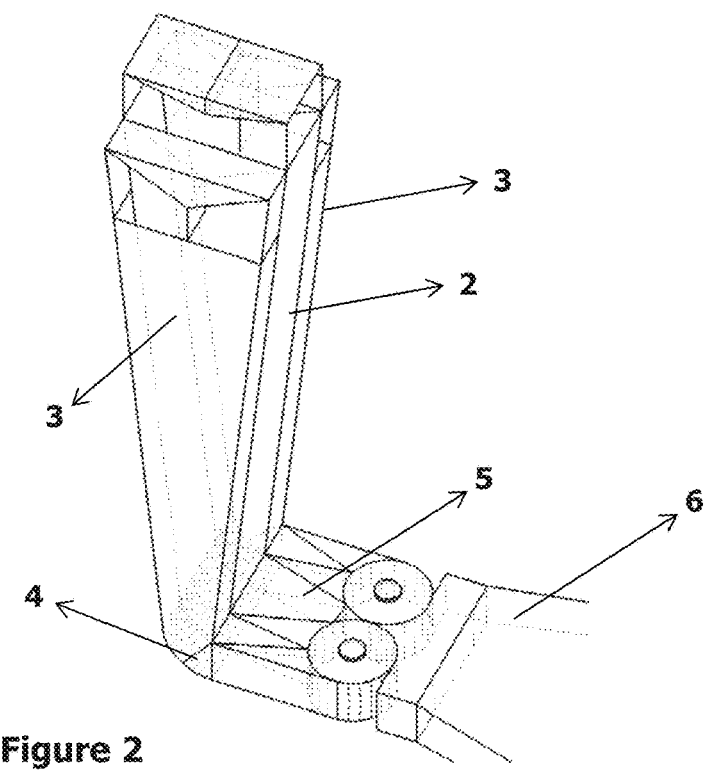

FIG. 2: Close-up perspective view of the top of the solar chimney configuration.

Figure 3:
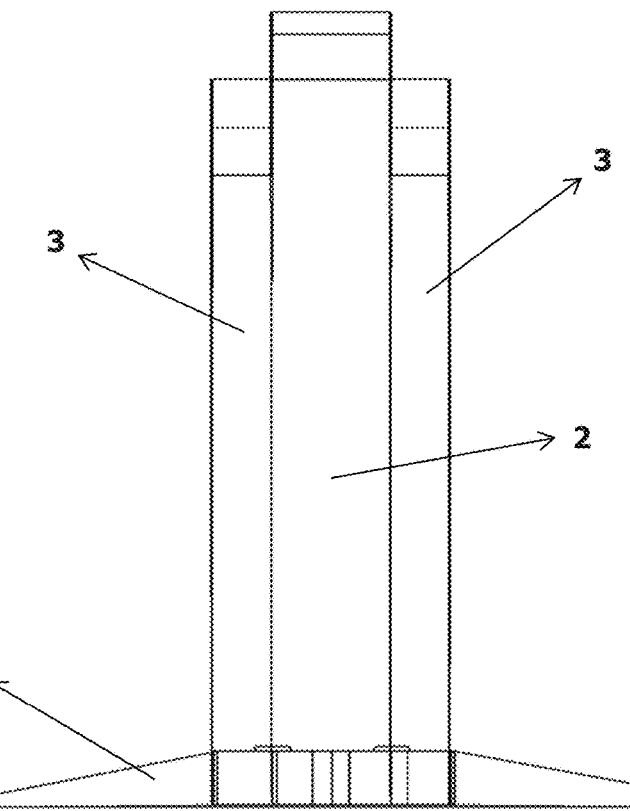

FIG. 3: Front view of the solar chimney configuration.

Figure 4:
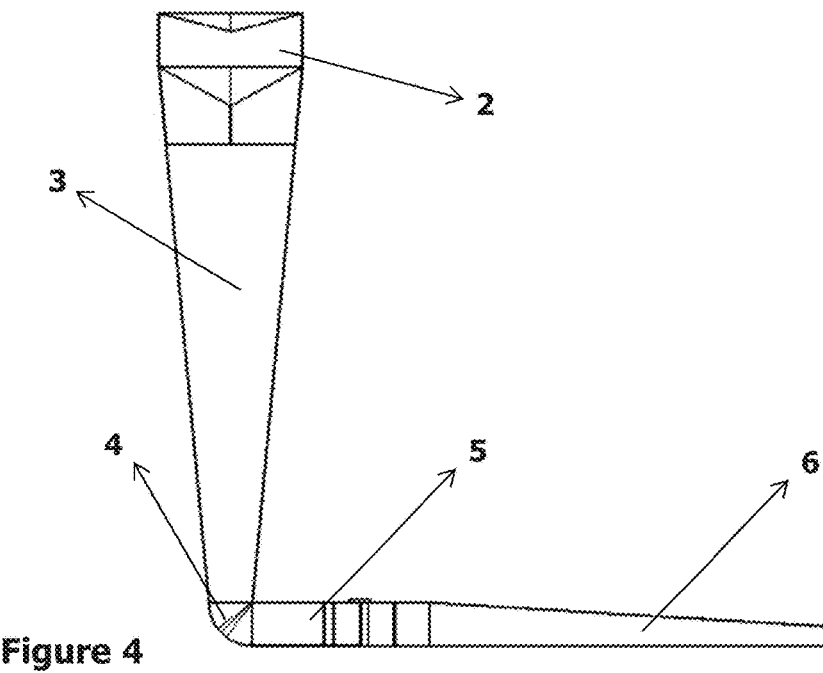

FIG. 4: Side view of the solar chimney configuration.

Figure 5:
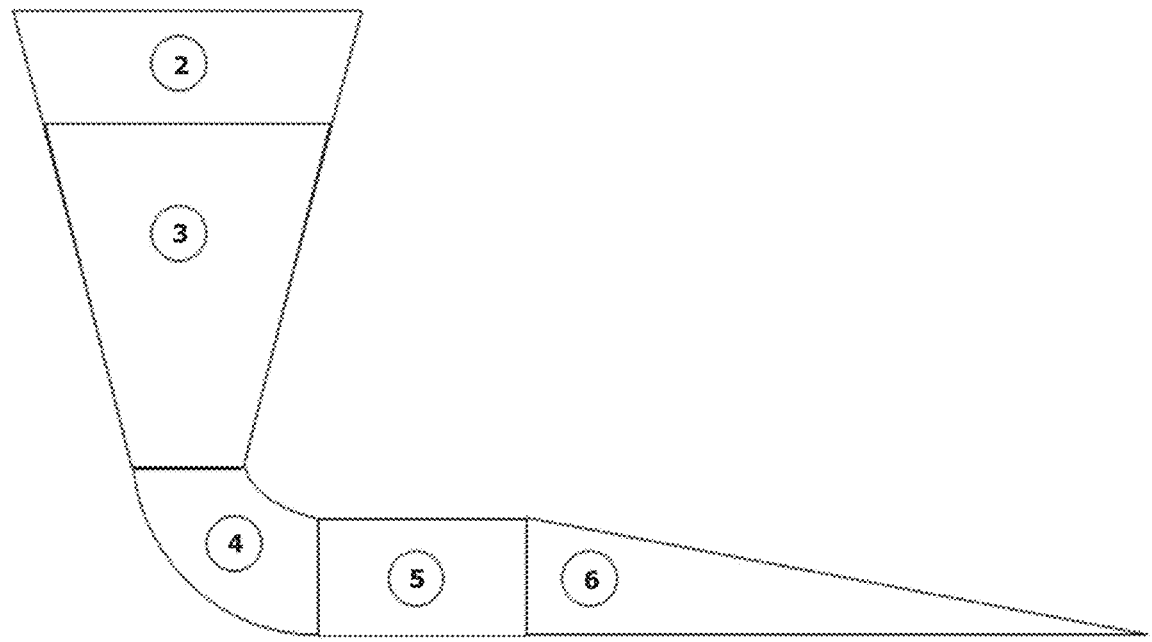

FIG. 5: Cross-sectional side view of the solar chimney configuration.

Figure 6:
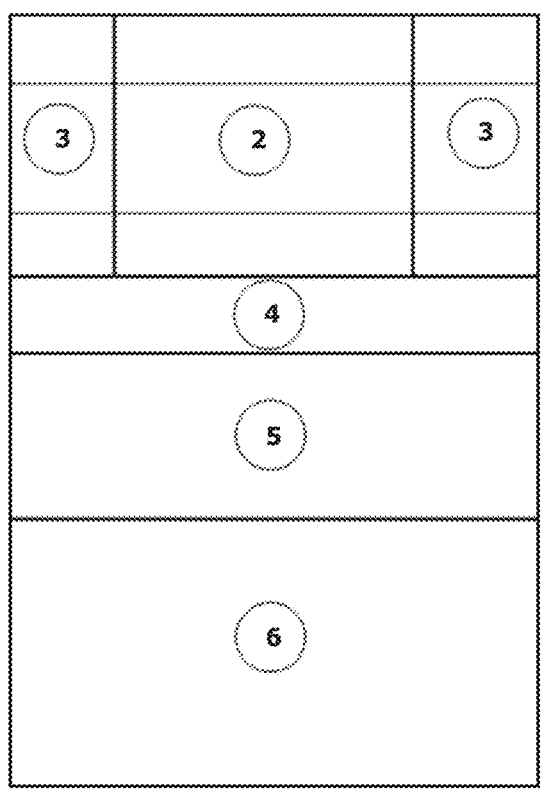

FIG. 6: Cross-sectional top view of the solar chimney configuration.

FIG. 7: Front view of illustrative air flow in the solar chimney configuration.

FIG. 8: Side view of illustrative air flow in the solar chimney configuration.

FIG. 9: Frontal close-up view of illustrative air flow in the solar chimney configuration.

FIG. 10: Frontal close-up view of illustrative air flow in a different embodiment of solar chimney configuration.

Figure 11:
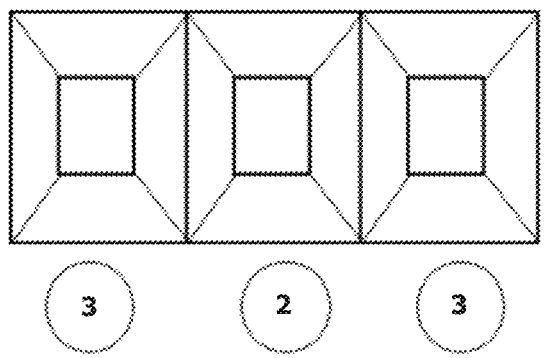

FIG. 11: Top view of the solar chimney configuration.

Figure 12:
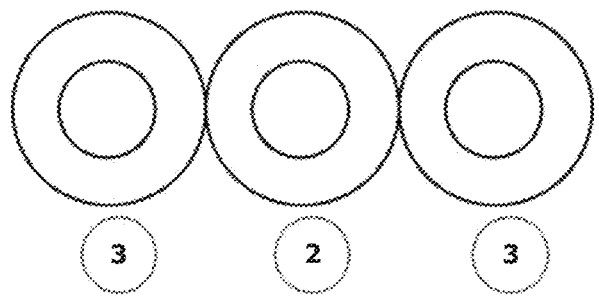

FIG. 12: Top view in a different embodiment of solar chimney configuration.

Figure 13:
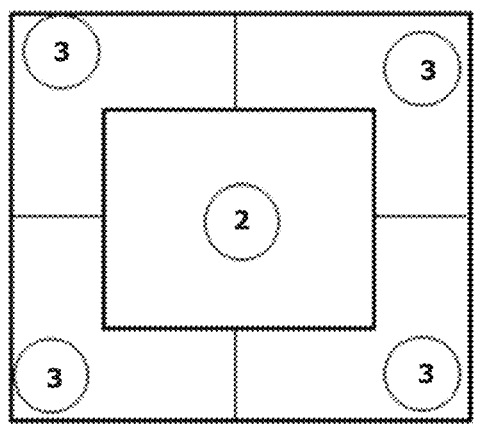

FIG. 13: Top view in another embodiment of solar chimney configuration.

Figure 14:
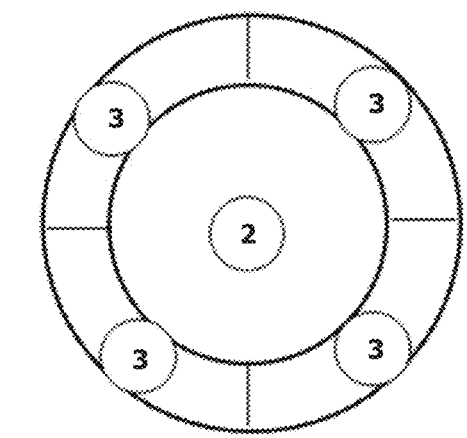

FIG. 14: Top view in another embodiment of solar chimney configuration.

Figure 15:
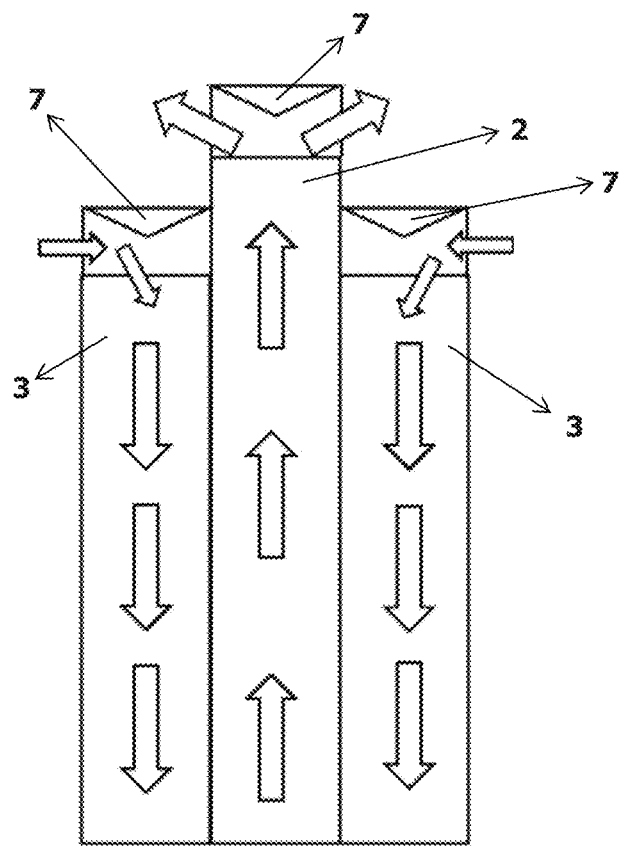

FIG. 15: Front view of illustrative air flow in a venturi cap embodiment of solar chimney configuration.

Figure 16:
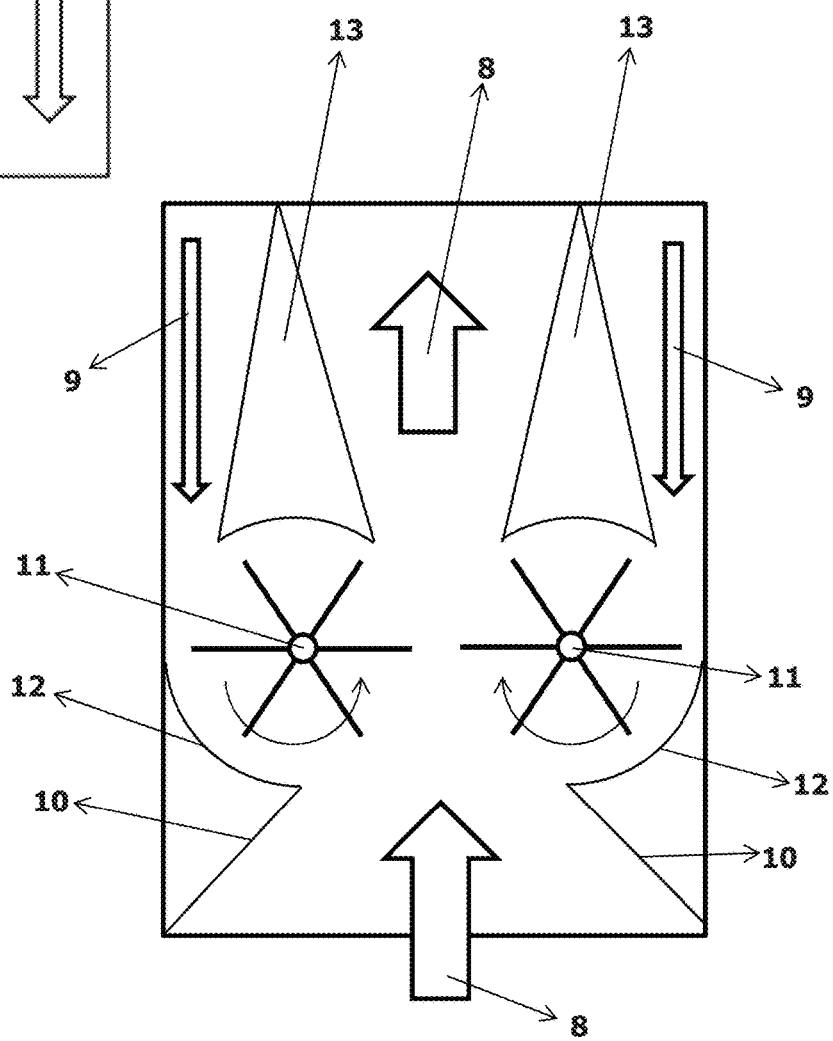

FIG. 16: Cross-sectional top view of turbine section in the solar chimney configuration.

Figure 17:
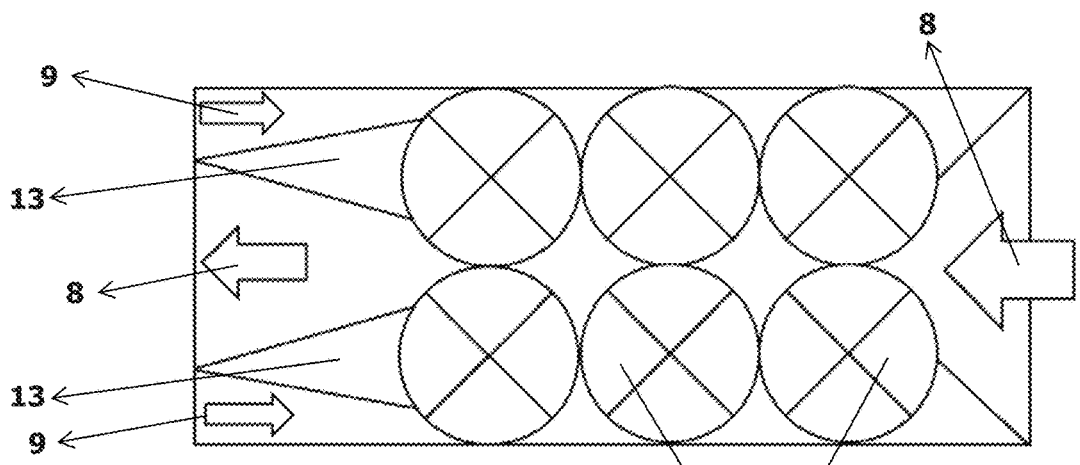

FIG. 17: Cross-sectional top view of the embodiment of the multiple-stage turbine group in the solar chimney configuration.

Figure 18:
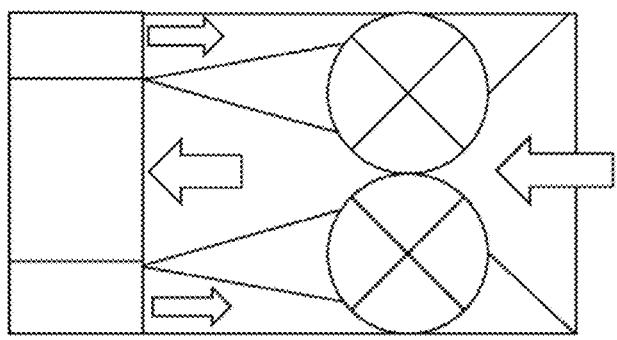

FIG. 18: Cross-sectional top view of another embodiment of the multiple-stage turbine group in the solar chimney configuration.

Figure 19:
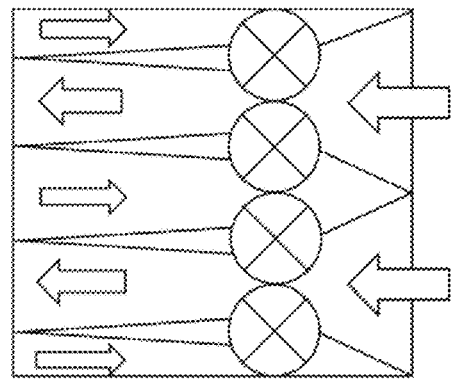

FIG. 19: Cross-sectional top view of another embodiment of the multiple-stage turbine group in the solar chimney configuration.

Figure 20:
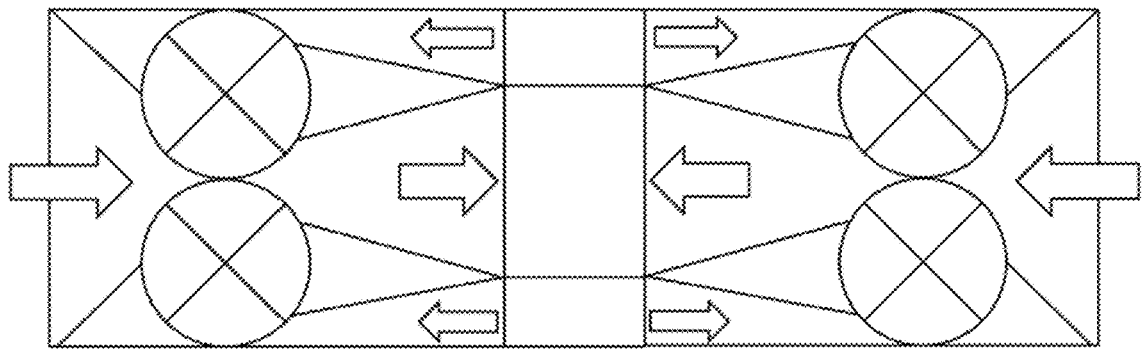

FIG. 20: Cross-sectional top view of another embodiment of the multiple-stage turbine group in the solar chimney configuration.

Figure 21:
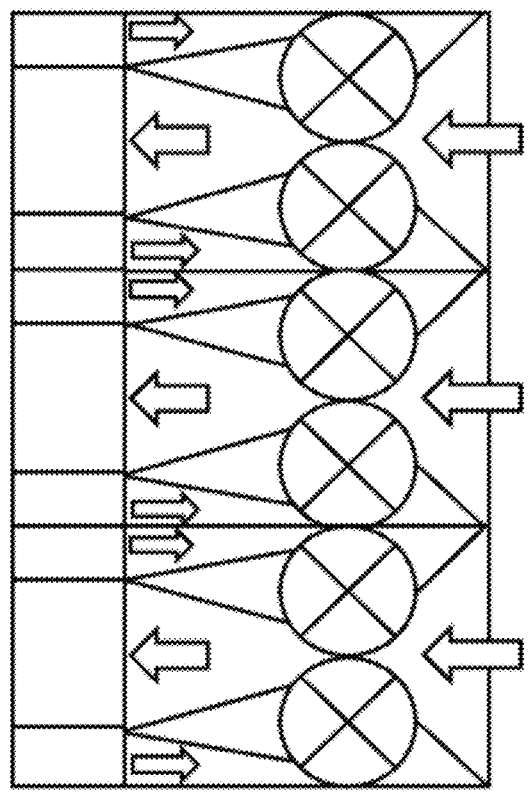

FIG. 21: Cross-sectional top view of an embodiment of the multiple turbine group and multiple tower in the solar chimney configuration.

Figure 22:
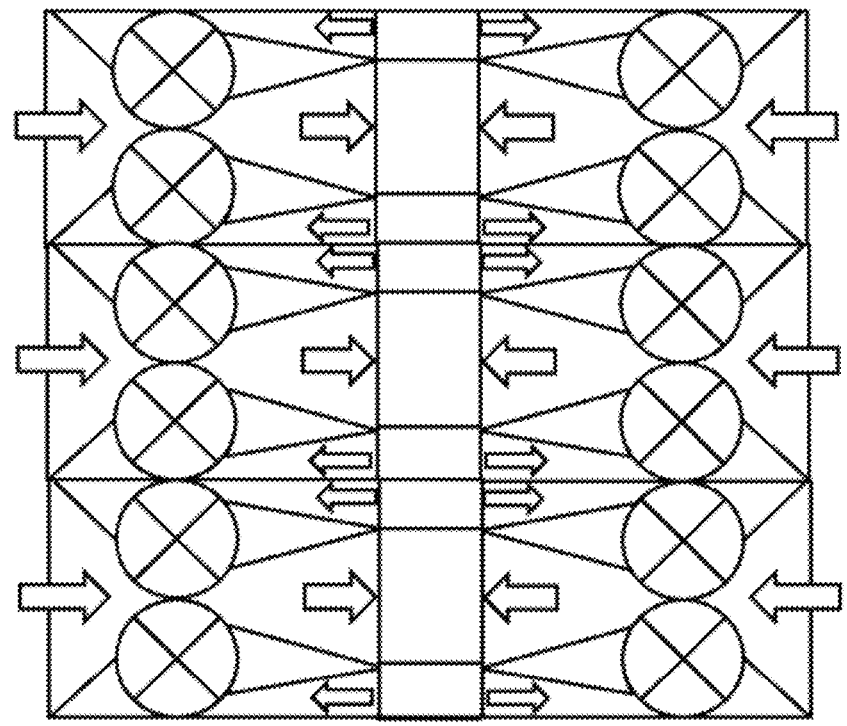

FIG. 22: Cross-sectional top view of another embodiment of the multiple turbine group and multiple tower in the solar chimney configuration.

FIG. 23: The solar chimney configuration perspective view of the prior art.

FIG. 24: The solar chimney configuration cross-sectional side view of the prior art.

DESCRIPTIONS OF ELEMENTS/PARTS/COMPONENTS OF THE INVENTION

To explain better the developed solar chimney configuration within this invention, parts and elements in drawings are numbered and designated separately as follows, 1. Solar chimney configuration
2. Updraft chimney
3. Downdraft chimney
4. Interconnect part
5. Vertical turbine group
6. Collector
7. Venturi cap
8. Updraft air flow
9. Downdraft air flow
10. Diffuser wall
11. Vertical turbine
12. Turbine case
13. Chimney separation wall
14. Solar chimney (prior art)
15. Collector (prior art)
16. Greenhouse area (prior art)

DETAILED DESCRIPTION OF THE INVENTION

In the solar chimney configuration (1) subject to the invention, different from solar chimneys in prior art (14), three different chimney systems have been provided.

In the tripartite chimney system, one chimney at the center is an updraft chimney (2), which sucks up the hot air provided by collector (6), and the air is discharged to the environment from the opening of the chimney (2) that opens upward. By means of this chimney (2) the hot air provided by the collector (6) moves towards the chimney (2), where it is further accelerated due to the suction effect of the chimney (2), then it passes through the vertical turbine group (5) in the Y axis direction, and it rotates the vertical turbines (11), and provides electricity generation from the generators connected to vertical turbines (11).

The two outer chimneys that have been placed adjacent to the chimney (2), on both sides of said updraft chimney (2) are downdraft chimneys (3), where said chimneys are at least two chimneys that have been placed on each side of said updraft chimney (2).

The downdraft chimneys (3), speed up the outside air and transfer it to the vertical turbine group (5) which is located at the bottom of the chimneys (3). The downdraft chimneys (3) pull down the outside air by means of the following factors:

- As a result of the density difference between outside air and the warm air located in the vertical turbine group (5), the outside air is sucked from the downdraft chimneys (3), and it is pushed down.
- The outside air is sucked from the downdraft chimneys (3) and pushed downward by the effect of the negative pressure created by the downdraft chimneys (3) of the vertical turbine group (5) during the rotation of the vertical turbine group (5) rotated by the hot air.
- The environment air is sucked from the downdraft chimneys (3) and pushed down due to the effect of the pressure difference between high atmospheric air pressure formed at the entrance of the downdraft chimneys (3) and the low pressure caused by the hot air flow in the vertical turbine group (5).
- The outside air is sucked from downdraft chimneys (3) and pushed down due to the wind pressure caused by the wind which affects the entrance of the downdraft chimneys (3).
- Besides natural factors, it is possible to obtain forced air by means of mechanical humidification systems in downdraft chimneys (3). In this case, the outside air is sucked from the downdraft chimneys (3) and is pushed down due to the difference between the high density formed at the entrance the downdraft chimneys (3), and low density at the vertical turbine group (5).

As a result of the factors described above, the outside air which flows down from the downdraft chimneys (3), after it accelerates, passes through the vertical turbine group (5) and enables the vertical turbines (11) to rotate and therefore enables the generators connected to the turbines (11) to produce electricity.

Since both air flow systems operate simultaneously, the vertical turbines (11) of the vertical turbine group (5) rotate by being driven with the combined air flow (8 and 9) transferred from both the updraft chimney (2) and downdraft chimneys (3).

By means of this flow arrangement, which is the main novelty of the invention, the flow arrangements of the updraft and downdraft systems, which normally operate as separate mechanisms are combined.

The main factor that enables the combination of the updraft and downdraft mechanisms in one system, is the turbine arrangement in the solar chimney configuration (1) subject to the invention. In the new turbine arrangement, the vertical turbine group (5) and the vertical turbines (11) located therein, are positioned at the entrance of chimney, not inside the chimney itself, like in the classical application. Here, above-mentioned chimney entrance defines the starting point of the interconnection part (4) where the bottom sections of the updraft chimney (2) and downdraft chimneys (3) join each other and which enables the connection of chimneys (2 and 3) to vertical turbine group (5).

The turbine type in the vertical turbine group (5) is a vertical axis turbine (VAT), not a horizontal axis turbine (HAT) known in the state of art. By using this, the vertical turbine (11) blades benefit from the "double-sided" air flow (8 and 9) which is provided by the chimneys (2 and 3).

A solar chimney configuration (1) that has been developed to produce electrical energy by means of the transfer of the accelerated airflow in the chimneys and the rotation of the turbines and the generators that are connected to the these turbines, wherein said chimney configuration comprises the following in order to produce electrical energy via simultaneous usage of two different airflows (8 and 9) that move both up and down;

At least one updraft chimney (2) which is connected to an interconnection part (4) from the bottom that is used to accelerate the hot air provided by collector (6) and to discharge it to the surroundings, At least two downdraft chimneys (3) that are connected to the interconnection part (4) from the bottom, that is positioned adjacent to the updraft chimney (2) from the sides, which allows the transfer of the ambient air that has been received from the top section of the chimney, to the interconnection part (4) by accelerating the air downward, At least an interconnection part (4) which enables the transfer of airflows (8 and 9) between the chimneys (2 and 3) and the vertical turbine group (5), where the updraft chimney (2) and the downdraft chimneys (3) are coupled adjacently to each other.

A vertical turbine group (5), where the air flows (8 and 9) are directed by the downdraft chimneys (3) and the collector (6) and which houses diffuser walls (10), vertical turbines (11), turbine cases (12), chimney separation walls (13), and generators connected to the vertical turbines (11), A collector (6) which is connected to vertical turbine group (5), and which provides hot air flow to said group, Two diffuser walls (10) that are used to accelerate and transfer the hot air from collector (6) to vertical turbines (11), and which are positioned at the edges of the collector (6), on the side of vertical turbine group (5), At least one vertical turbine (11) that is used to convert mechanical energy to kinetic energy, which is driven by the force of the air flows (9) provided by the collector (6) and downdraft chimneys (3), At least one turbine case (12) for the turbine (11) which limits the positioning area of the vertical turbines (11) and, At least two chimney separation walls (13) which prevent the mixing of downdraft air flow (9) provided by downdraft chimney (3) to vertical turbine group (5) via the interconnection part (4), and the air flow (8) provided by the vertical turbine group (5) to the updraft chimney (2) via the interconnection part (4).

In another embodiment of the invention, to provide functions described below, at least one venturi cap (7) for each chimney (2 and 3) is used which is mounted at the top points of the chimneys (2 and 3) (FIG. 15);

Acceleration of the updraft air flow (8) at the chimney outlet point, that is discharged via the updraft chimney (2) after it is received from the vertical turbine group (5) and Acceleration of the downdraft air flow at the chimney (3) entrance point that is initially sucked in from the outside environment by the downdraft chimneys (3).

The collector (6) element of the solar chimney configuration (1) subject to the invention is basically a structural connection part, that enables the hot air that is provided by solar energy, glass greenhouses, photovoltaic/thermal methods, geothermal sources, waste heat sources or hot air provided from any other heat sources and collects said air and transfers it to the vertical turbine group (5) and that provides airflow between the hot air source and the vertical turbine group (5) (FIG. 1 and FIG. 4).

The updraft chimney (2) and downdraft chimneys (3) can have a prismatic or circular fixed sectional geometry (e.g. FIGS. 11-14), or in another embodiment of the invention, they can have a diffuser shape where the bottom cross sections are narrower compared to the top cross sections (e.g. FIGS. 8-10).

Although the downdraft chimneys (3) are positioned adjacently to the updraft chimney (2) sides (e.g. FIGS. 7,9,11), in different embodiment of the invention, it is also possible for chimneys (2 and 3) to be placed telescopically (e.g. FIGS. 10,13,14).

The vertical turbines (11) used inside the vertical turbine group (5) may be turbines (11) with lift type airfoil blades or drag type blades. Or it is possible for the vertical turbines (11) to be vertical turbines (11) which have both lift type airfoil and drag type blades. In the case of a single type vertical turbine (11) use, there could be one vertical turbine (11) in the vertical turbine group (5), or it is possible to use at least two vertical turbines (11) together in the vertical turbine group (5).

At the same time, in one embodiment of the invention, in addition to diffuser walls (10) or in the case when diffuser walls (10) are not used, it is possible to use guide vanes to speed up the air flow velocity at the entrances of the vertical turbines (11) on the collector side (6), or the interconnection parts (4).

In the basic embodiment of the invention, as shown in FIG. 16, a one stage vertical turbine (11) configuration may be used, or like in different embodiments of the invention, as shown in FIG. 17 and FIG. 19, it is possible to use a multi-staged vertical turbine (11) configuration.

In the basic embodiment of the invention, the connection of vertical turbine group (5) with updraft chimney (2) and downdraft chimneys (3) could be a single-sided connection as shown in FIG. 18; or in different embodiments of the invention, as shown in FIGS. 20-22, it is possible to have a connection on more than one side or at more than one point.

The invention claimed is:

1. A solar chimney configuration comprising:
at least one updraft chimney connected to an interconnection part at a bottom, the at least one updraft chimney configured to accelerate hot air provided by a collector and to discharge the hot air to surroundings,
at least two downdraft chimneys connected to the interconnection part at the bottom, wherein each one of the at least two downdraft chimneys is positioned at either side of the at least one updraft chimney, the at least two downdraft chimneys configured to transfer ambient air that has been received from a top section of the solar chimney configuration, to the interconnection part by accelerating the ambient air downward,
the interconnection part configured to transfer airflows between the at least one updraft chimney, the at least two downdraft chimneys and a vertical turbine group, wherein the at least one updraft chimney and the at least two downdraft chimneys are coupled adjacent to each other,
the vertical turbine group, to which the airflows are directed by the at least two downdraft chimneys and the collector, the vertical turbine group housing at least two diffuser walls, at least one vertical turbine, at least one turbine case, at least two chimney separation walls, and generators connected to the at least one vertical turbine,
the collector, s connected to the vertical turbine group, and which provides hot airflow to the vertical turbine group, the at least two diffuser walls configured to accelerate and transfer the hot air from the collector to the at least one vertical turbine, and which are positioned at edges of the collector, on a side of the vertical turbine group, the at least one vertical turbine configured to convert mechanical energy to kinetic energy, the at least one vertical turbine driven by force of the airflows provided by the collector and the at least two downdraft chimneys, the at least one turbine case for the at least one vertical turbine, the at least one turbine case configured to limit a positioning area of the at least one vertical turbine and, the at least two chimney separation walls configured to prevent mixing of downdraft airflow provided by the at least two downdraft chimneys to the vertical turbine group via the interconnection part, and airflow provided by the vertical turbine group to the at least one updraft chimney via the interconnection part.

2. The solar chimney configuration according to claim 1, wherein the collector comprises a structural connection part configured to: collect the hot air obtained by one or more of solar energy, glass greenhouse area, solar photovoltaic methods, thermal methods, geothermal sources, waste heat sources and respective hot air from any other heat sources; transfer the hot air to the vertical turbine group; and provide the airflows between a hot air source and the vertical turbine group.

3. The solar chimney configuration according to claim 1, wherein the at least one updraft chimney and the at least two downdraft chimneys have prismatic or circular constant cross-sectional geometry.

4. The solar chimney configuration according to claim 1, further comprising a multi staged vertical turbine configuration.

5. The solar chimney configuration according to claim 1, wherein a connection of the at least one updraft chimney and the at least two downdraft chimneys with the vertical turbine group is established on more than one side or at more than one point.

6. The solar chimney configuration according to claim 1, wherein the vertical turbine group and the at least one vertical turbine inside the vertical turbine group are positioned at an entrance of the solar chimney configuration.

7. The solar chimney configuration according to claim 1, wherein the at least one updraft chimney and the at least two downdraft chimneys have combined airflow after the at least one vertical turbine.

8. The solar chimney configuration according to claim 1, wherein the at least one vertical turbine in the vertical turbine group, have a rotating configuration via a combined drive force of the airflows transferred by both the updraft at least one updraft chimney and the at least two downdraft chimneys.

9. A solar chimney device comprising:
a collector configured to heat air therein via solar radiation;
an interconnection part;
at least one updraft chimney connected to the collector at a bottom end via the interconnection part, the at least one updraft chimney configured to receive an upward airflow comprising hot air provided by the collector through the interconnection part;
at least one downdraft chimney connected to the interconnection part, the at least one downdraft chimney configured to transfer a downward airflow of ambient air, received at a top end, to the interconnection part;
at least one vertical turbine located relative to the upward airflow and the downward airflow flowing through the interconnection part such that the upward airflow and the downward airflow drive the at least one vertical turbine,
at least a second downdraft chimney which provides respective downward airflow to further drive the at least one vertical turbine; and
respective vertical turbines for each downdraft chimney, each of the respective vertical turbines driven by the upward airflow and respective downward airflows.

10. The solar chimney device of claim 9, wherein a respective top end of the at least one updraft chimney is at a higher elevation than the top end of the at least one downdraft chimney.

11. The solar chimney device of claim 9, further comprising at least one chimney separation wall configured to prevent mixing of the upward airflow and the downward airflow.

12. The solar chimney device of claim 9, further comprising at least one diffuser wall configured to one or more of accelerate and transfer the hot air from collector to the at least one vertical turbine.

13. The solar chimney device of claim 9, further comprising at least one venturi cap for each of the at least one updraft chimney and the at least one downdraft chimney, the at least one venturi cap mounted at a respective top of a respective chimney.

14. The solar chimney device of claim 9, wherein one or more of the at least one updraft chimney and the at least one downdraft chimney have a diffuser-shaped cross-section such that a respective bottom cross-section is narrower than a respective top cross-section.

15. The solar chimney device of claim 9, wherein the at least one downdraft chimney is positioned adjacent the at least one updraft chimney at respective sides.

16. The solar chimney device of claim 9, wherein the at least one vertical turbine comprises one or more of lift type airfoil blades and drag type blades.

17. The solar chimney device of claim 9, wherein the at least one vertical turbine comprises a vertical axis turbine.

18. The solar chimney device of claim 9, further comprising guide vanes configured to accelerate respective airflow at respective entrances to one or more of the interconnection part and the at least one vertical turbine.

* * * * *

UNITED STATES PATENT AND TRADEMARK OFFICE
CERTIFICATE OF CORRECTION

PATENT NO. : 11,274,661 B2
APPLICATION NO. : 16/485498
DATED : March 15, 2022
INVENTOR(S) : Dogan Eryener It is certified that error appears in the above-identified patent and that said Letters Patent is hereby corrected as shown below:

In the Claims

Column 6, Line 63, Claim 1, "the collector, s connected to" should read --the collector connected to--.

Signed and Sealed this
Thirtieth Day of August, 2022

Katherine Kelly Vidal
*Director of the United States Patent and Trademark Office*